United States Patent
Dickson et al.

(10) Patent No.: US 8,842,722 B2
(45) Date of Patent: *Sep. 23, 2014

(54) DECISION FEEDBACK EQUALIZERS WITH HIGH-ORDER CONTINUOUS TIME FEEDBACK

(75) Inventors: Timothy O. Dickson, Danbury, CT (US); Rui Yan Matthew Loh, Pasadena, CA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/591,403

(22) Filed: Aug. 22, 2012

(65) Prior Publication Data

US 2014/0056344 A1    Feb. 27, 2014

(51) Int. Cl.
    *H03H 7/30*    (2006.01)
(52) U.S. Cl.
    USPC ........... 375/233; 375/231; 375/229; 375/230; 375/316; 327/58; 327/199; 327/211
(58) Field of Classification Search
    CPC ............. H04L 25/03057; H04L 2025/0349; H04L 2025/03617; H04L 25/03885; H04L 27/01
    USPC ........... 375/233, 231, 229, 230, 316; 327/58, 327/199, 211
    See application file for complete search history.

(56) References Cited

U.S. PATENT DOCUMENTS

| | | | |
|---|---|---|---|
| 5,940,441 A * | 8/1999 | Cranford et al. | 375/232 |
| 6,437,932 B1 * | 8/2002 | Prater et al. | 360/46 |
| 7,542,508 B2 * | 6/2009 | Marlett et al. | 375/233 |
| 2005/0135475 A1 | 6/2005 | Momtaz et al. | |
| 2006/0239341 A1 * | 10/2006 | Marlett et al. | 375/233 |
| 2008/0069191 A1 * | 3/2008 | Dong et al. | 375/219 |
| 2008/0080610 A1 | 4/2008 | Aziz et al. | |
| 2010/0150221 A1 | 6/2010 | Jenkins et al. | |
| 2010/0202506 A1 * | 8/2010 | Bulzacchelli et al. | 375/233 |
| 2012/0141122 A1 * | 6/2012 | Carusone et al. | 398/37 |
| 2012/0230385 A1 * | 9/2012 | Currivan et al. | 375/233 |
| 2012/0314757 A1 * | 12/2012 | Bulzacchelli et al. | 375/233 |
| 2014/0056345 A1 * | 2/2014 | Dickson et al. | 375/233 |

FOREIGN PATENT DOCUMENTS

| | | |
|---|---|---|
| EP | 1545030 A2 | 6/2005 |
| EP | 1748611 A1 | 1/2007 |
| WO | 2009045193 A1 | 4/2009 |
| WO | 2010089170 A2 | 8/2010 |

OTHER PUBLICATIONS

Anonymously, "Continuous Time, Interface Calibration for a High-Speed Interface—Decision Feedback Equalization (DFE)," www.ip.com, IPCOM000196836D, Jun. 2010, 5 pages.

F. O'Mahony et al., "The Future of Electrical I/O for Microprocessors," IEEE International Symposium on VLSI Design, Automation and Test (VLSI-DAT), Apr. 2009, pp. 31-34.

(Continued)

*Primary Examiner* — Kenneth Lam

(74) *Attorney, Agent, or Firm* — Anne V. Dougherty; Ryan, Mason & Lewis, LLP

(57) ABSTRACT

Equalization techniques are provided for high-speed data communications and, more specifically, DFE (decision feedback equalizer) circuits and methods are provided which implement a high-order continuous time filter in a DFE feedback path to emulate structured elements of a channel response.

4 Claims, 4 Drawing Sheets

(56) References Cited

OTHER PUBLICATIONS

B. Kim et al., "A 10-Gb/s Compact Low-Power Serial I/O with DFE-IIR Equalization in 65-nm CMOS," IEEE Journal of Solid-State Circuits, Dec. 2009, pp. 3526-3538, vol. 44, No. 12.

S. Quan et al., "A 1.0625-to-14.025Gb/s Multimedia Transceiver with Full-Rate Source-Series-Terminated Transmit Driver and Floating-Tap Decision-Feedback Equalizer in 40nm CMOS," IEEE International Solid-State Circuits Conference (ISSCC), Session 20, High Speed Transceivers & Building Blocks, Feb. 2011, pp. 348-350.

\* cited by examiner

100

200

300

400

500

DECISION FEEDBACK EQUALIZERS WITH HIGH-ORDER CONTINUOUS TIME FEEDBACK

STATEMENT REGARDING FEDERALLY SPONSORED RESEARCH OR DEVELOPMENT

This invention was made with Government support under Contract No.: H98230-07-C-0409 (awarded by the National Security Agency (NSA)). The Government has certain rights in this invention.

TECHNICAL FIELD

The field relates generally to equalization techniques for high-speed data communications and, more specifically, to DFE (decision feedback equalizer) circuits and methods that implement a high-order continuous time filter in a DFE feedback path to emulate structured elements of a channel response.

BACKGROUND

In general, designing high-speed interconnect network structures poses a considerable power challenge as data rates scale to support higher-performance computing systems, both in the server and workstation/desktop space. Indeed, although data rate demands are currently increasing about 2×~3× annually, improvements in link technology only yield about 20% annual reduction in link power consumption. An important building block in serial communication interconnect architectures is an equalizer, which is used to compensate for channel losses and imperfections caused by various physical effects such as the skin effect, dielectric loss, and reflections due to impedance discontinuities (such as via stubs). In the time domain, these channel losses and impairments can lead to broadening of transmitted pules over more than one unit interval (UI), whereby a received signal can suffer from intersymbol interference (ISI)

A decision feedback equalizer (DFE) is one type of receiver-side equalizer that is commonly employed in high-speed serial communications to compensate for the signal distortions that occur when fast digital pulses are transferred over electrical channels with limited bandwidth. A fundamental advantage of a DFE over a linear equalizer (such as a peaking amplifier) is that a DFE can flatten the channel response (and reduce signal distortion) without amplifying noise or crosstalk and, thus, equalize a channel without noise enhancement.

In general, a DFE uses the decision about the value of the current bit to predict its contribution to intersymbol interference (ISI) produced by channel loss. This prediction is then used to cancel the ISI's effects on subsequent bits via a sum of weighted coefficients ("taps"). More specifically, in a DFE, the previously decided bits are fed back with weighted tap coefficients and added to the received input signal. For an M-tap DFE, the feedback taps are denoted H1, H2, . . . , HM. The H1 tap represents the intersymbol interference (ISI) contributed by a data bit one unit interval (UI) earlier than the current bit being detected, the H2 tap represents the ISI contributed by a data bit two UIs earlier than the current bit, and so on. If the magnitudes and polarities of the tap weights are properly adjusted to match the channel characteristics, the ISI from the previous bits in the data stream will be cancelled, and the bits can be detected by a decision-making latch with a low BER (bit error rate).

As the data rates increase, however, the number of taps required to successfully equalize a channel increases accordingly. This constitutes a major barrier to data rate scaling, since each tap requires dedicated hardware and adds to the loading at a summation node, which is part of the critical timing path.

SUMMARY

Exemplary embodiments of the invention generally include to equalization techniques for high-speed data communications and, more specifically, to DFE (decision feedback equalizer) circuits and methods that implement a high-order continuous time filter in a DFE feedback path to emulate structured elements of a channel response.

In one exemplary embodiment, a DFE circuit includes a summer circuit, a decision-making slicer circuit, and a feedback circuit. The summer circuit adds a first feedback signal to a received signal. The decision-making slicer circuit samples an output of the summer circuit. The feedback circuit comprises a first feedback filter in a first feedback path of the DFE, wherein the first feedback filter comprises a continuous time filter with an order greater than 1. The first feedback filter filters an output of the decision-making slicer circuit to produce the first feedback signal that is added to the input signal by the summer circuit to cancel intersymbol interference (ISI). The first feedback filter can be a high order low-pass filter, band pass filter, high-pass filter, notch filter, low-pass notch filter, or other types of high-order continuous time filters that are designed to cancel ISI caused by various types of channel impairments.

In another exemplary embodiment, a method for decision feedback equalization includes adding at least a first feedback signal to a received signal to generate an input signal, sampling the input signal to generate an output signal, and filtering the output signal with at least a first feedback filter in a first feedback path to generate the first feedback signal, wherein the first feedback filter comprises a continuous time filter with an order greater than 1, wherein the first feedback signal is added to the input signal by the summer circuit to cancel intersymbol interference (ISI).

These and other exemplary embodiments of the present invention will become apparent from the following detailed description of exemplary embodiments thereof, which is to be read in connection with the accompanying drawings.

DETAILED DESCRIPTION OF EXEMPLARY EMBODIMENTS

Exemplary embodiments will now be discussed in further detail with regard to equalization circuits and methods for high-speed data communications and, more specifically, to decision feedback equalizer circuits and methods that implement one or more high-order continuous time filters in a feedback path of the DFE to emulate structured elements of a channel response. In general, embodiments of the invention incorporate one or more high-order (i.e., order greater than one) continuous-time feedback filters in a feedback circuit of a decision feedback equalizer to emulate the structured elements of a channel response. Embodiments of the invention allow implementation of complex filter transfer functions (band-pass, notch, etc.) which can be used to overcome channel impairments that cannot be compensated by a DFE with a simple first-order (i.e., RC) continuous-time feedback filter.

Figure 1:
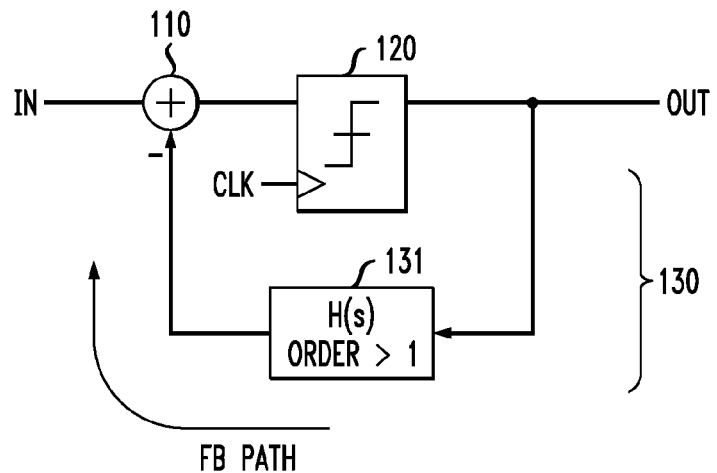
FIG. 1 is a block diagram of a DFE circuit implementing a high-order continuous time filter in a feedback path of the DFE, according to an exemplary embodiment of the invention.

For example, FIG. 1 is a block diagram of a DFE circuit implementing a high-order continuous time filter in a feedback path of the DFE, according to an exemplary embodiment of the invention. In general, FIG. 1 shows a DFE circuit 100 comprising a summer amplifier circuit 110 (or summer), a decision-making slicer circuit 120 (or latch), and a feedback circuit 130. The feedback circuit 130 comprises a high-order (order >1) continuous time feedback filter (e.g., a linear, continuous time infinite impulse response (IIR) filter) in a feedback path $FB_{path}$ of the DFE circuit 100. The summer circuit 110 receives input data from an incoming signal and receives a feedback signal from the output of the continuous time feedback filter 130) in the feedback path $FB_{path}$. The summer circuit 110 adds a negative feedback signal (output from the feedback filter 131) with the input data signal. The output of the summer circuit 110 is input to the decision-making slicer 120, which is driven by a clock signal CLK to sample the output signal of the summer circuit 110 and generate a binary output (e.g., logic "0" or logic "1") by detecting the logic level of a data bit in the input signal. The summer circuit 110 and decision-making slicer 120 in the architecture of FIG. 1 can be implemented using known circuit topologies, such as CML(current mode logic) circuitry, which are suitable for the given DFE application.

The binary output of the decision-making slicer 120 is sent to an output circuit (for processing by a receiver circuit) and also fed back to the feedback circuit 130 and filtered by the feedback filter 131. The feedback filter 131 filters the output of the decision-making slicer 120 to produce a filtered signal that can be subtracted from the input signal by the summer circuit 110 to cancel the ISI and optimally reproduce the original data bit sequence in the incoming data signal. The high-order continuous time feedback filter circuit 131 in the feedback path $FB_{path}$ of the DFE circuit 100 can be designed to cancel ISI due to certain types of structured channel response, such as channel impairments that cause low-pass notch responses, AC coupled links that cause band pass responses, reflections that are caused by impedance discontinuities, etc.

As depicted in FIG. 1, the feedback filter 131 has a transfer function H(s) with an order greater than 1. It is understood that the order of the filter is described by the number of poles, either real or complex, of the filter transfer function. In one exemplary embodiment of the invention where the feedback filter 131 is implemented as a $2^{nd}$ order filter, the feedback filter 131 would be capable of implementing continuous-time transfer functions of the form:

$$H(s) = \frac{a_2 s^2 + a_1 s + a_0}{s^2 + \frac{\omega_0}{Q} s + \omega_0^2}$$

where the poles of the transfer function H(s) can be complex in order to emulate channel responses such as band pass, low pass, high pass, and notch responses, etc.

As is known in the art, the values of $a_2$, $a_1$ and $a_0$ can be selected using known techniques to design second order low pass, high pass or band pass filters. For instance, a second order low pass filter can be designed for values $a_2=0$, $a_1=0$ and $a_0 \neq 0$, wherein the ratio of $a_0$ to $\omega_0^2$ sets the gain of the low pass filter. A second order low-pass filter with complex poles can be implemented to obtain a desired peaking in a frequency response of the filter. Moreover, a second order high-pass filter can be designed for values $a_2 \neq 0$, $a_1=0$ and $a_0=0$, wherein the value of $a_2$ sets the gain of the high-pass filter. A second order high-pass filter with complex poles can be implemented to obtain a desired frequency response that can cancel ISI due to AC coupled links (no DC). Furthermore, a second order band-pass filter can be designed for values $a_2=0$, $a_1 \neq 0$ and $a_0=0$, wherein the ratio of $\omega_0$ to Q sets the bandwidth of the pass band, and the parameters Q, $a_1$, and $\omega_0$ set the center-frequency gain of the band-pass filter as $a_1 Q/\omega_0$. The selectivity of a feedback filter, such as a notch or band pass filter, can be further increased with orders >2. It is to be understood that the various types of feedback filters (band pass filters, notch filters, low-pass filters, low-pass notch filters. high-pass filters, etc.) can be designed according to the above noted transfer function H(s) using well known circuit topologies and techniques, the details of which are not necessary for understanding by one of ordinary skill in the art.

As would be understood by one skilled in the art, the filter transfer function H(s) can also be realized using a discrete-time filter implementation (for example, using switched-capacitor techniques) with a z-domain transfer function of the form:

$$H(s) = \frac{A_2 z^2 + A_1 z + A_0}{B_2 z^2 + B_1 z + B_0}$$

wherein the z-domain pole and zero locations for H(z) are set in such a manner as to achieve a desired frequency response similar to what could be achieved using continuous-time filter techniques, with the potential benefit of a more accurate transfer function realization.

Figure 2:
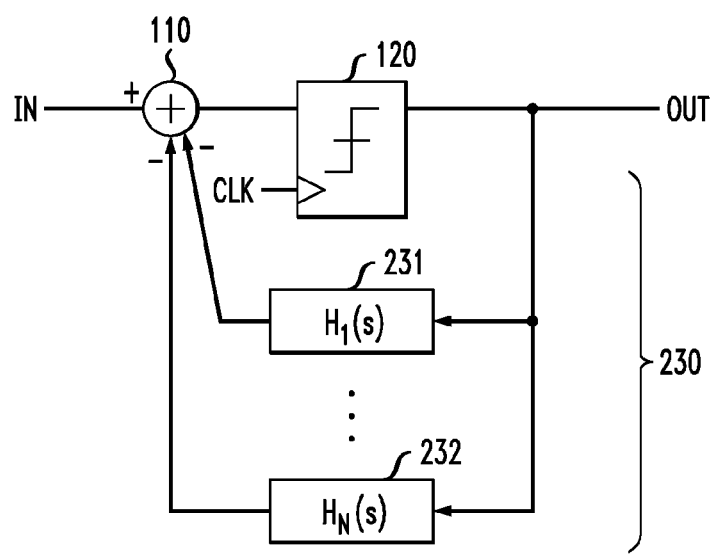
FIG. 2 is a block diagram of a DFE circuit implementing a high-order continuous time filter in a feedback path of the DFE, according to another exemplary embodiment of the invention.

In other exemplary embodiments of the invention, the feedback circuit of a DFE can be implemented using a plurality of continuous time feedback filters in separate feedback paths to achieve a more optimal cancellation of ISI depending on the channel response for the given application. For instance, FIG. 2 is a block diagram of a DFE circuit implementing at least one high-order continuous time filter in a feedback path of the DFE, according to another exemplary embodiment of the invention. More specifically, FIG. 2 shows a DFE circuit 200 comprising a summer amplifier circuit 110, a decision-making slicer circuit 120, and a feedback circuit 230. The summer circuit 110 and decision-making slicer circuit 120 operate similar to those circuits discussed above with reference to FIG. 1. The feedback circuit 230 of the DFE 200 of FIG. 2 comprises a plurality (N) of feedback filters, $H_1(s) \ldots H_N(s)$ that are connected in parallel in separate feedback paths that are fed back to the summer 110.

In the exemplary embodiment of FIG. 2, a first feedback filter 231 and a second feedback filter 232 may both be implemented as high order (>1) continuous time filters, which are used to cancel ISI due to different type of channel responses. For instance, the first feedback filter 231 may be a high order high-pass filter that is designed to cancel ISI caused by AC coupled links. Moreover, the second feedback filter 232 may be a $2^{nd}$ order filter that is designed to emulate reflections caused by via stubs, for example. With regard to channel response, a via stub looks like an unmatched quarter-wavelength filter and, thus, has an insertion loss similar to a notch filter. As a result, the return loss of a via stub structure (which causes the reflection) looks like a band-pass filter. In a longer chip-to-chip channel or a typical backplane channel, the dominant reflections arriving at the receiver occur between a via stub and impedance discontinuities at a package or connector. Among these structures, the via stub provides the greatest filtering effect. The ISI caused by via stub reflections can be cancelled using an appropriately designed high-order band pass filter.

In other embodiments of the invention, one of the feedback filters 231 or 232 can be implemented as a first order continuous time feedback filter to compensate for channel loss. Indeed, a high resistance channel provides channel loss that can be modeled by a first-order decay "tail" (i.e., decaying exponential) at sequential unit intervals (UI) after a main cursor. In this regard, a first-order RC low pass filter (which has a shape of a decaying exponential) can be implemented in a feedback path of the feedback circuit 230 of FIG. 2 to generate the feedback signal that is needed to cancel the post cursor ISI in the received data input due to channel loss. At the same time, another high-order feedback filter can compensate channel impairments such as those caused by a via stub as described above.

Figure 3:
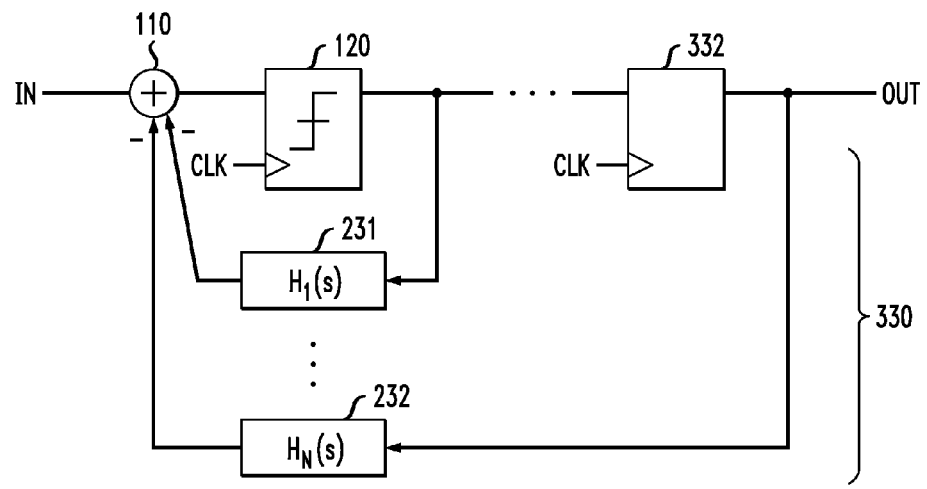
FIG. 3 is a block diagram of a DFE circuit implementing a high-order continuous time filter in a feedback path of the DFE, according to another exemplary embodiment of the invention.

In other exemplary embodiments of the invention, the feedback circuit of a DFE can be implemented using a plurality of continuous time feedback filters that are excited at different times in separate feedback paths to achieve a more optimal cancellation of ISI depending on the channel response for the given application. For instance, FIG. 3 is an illustrative embodiment of a DFE circuit 300 which is similar to the DFE circuit 200 of FIG. 2, except that the binary output of the decision-making slicer circuit 120 is captured by a digital delay line comprising a sequence of latch circuits 332 (or flip-flops) that are coupled to the inputs of different feedback paths of a feedback circuit 330. More specifically, as depicted in FIG. 3, a given output of the decision-making slicer circuit 120 is filtered by the first filter 231 without delay, while the same output of decision-making slicer circuit 120 is sequentially stored in one or more of the latches 332, and filtered by the second filter 232 at a subsequent time (a given delay) based on a specified number of clock cycles.

Figure 4:
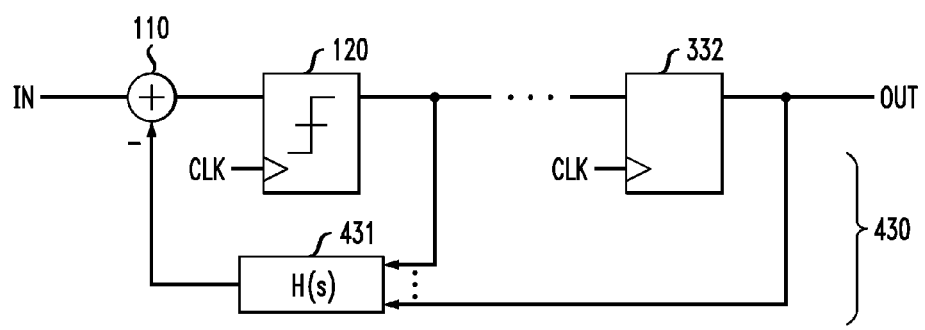
FIG. 4 is a block diagram of a DFE circuit implementing a high-order continuous time filter in a feedback path of the DFE, according to another exemplary embodiment of the invention.

With the exemplary embodiment of FIG. 3, one or more high order continuous time feedback filters in different feedback paths of the feedback circuit 330 can be used to filter the same output of the decision-making slicer 120 at different times by introducing a time delay between several different feedback filters via the latch circuits 332. This DFE embodiment allows ISI cancellation for different channel impairments that may occur at different times in response to a given data bit. For instance, in response to a solitary logic bit "1", multiple reflections can occur at different numbers of bit intervals due to different channel impairments. In this regard, the ISI that results from different reflections that occur at different times due to different channel impairments for a given input data bit can be canceled by exciting the different feedback filters in the feedback circuit 330 at different times. The various feedback filters 231 and 232 can be designed for different channel impairments that result in ISI at different times for a given data symbol. introducing a time delay between several different feedback filters In other exemplary embodiments of the invention, the feedback circuit of a DFE can be implemented using a one continuous time feedback filter that is excited at different times to achieve a more optimal cancellation of ISI depending on the channel response for the given application. For instance, FIG. 4 is an illustrative embodiment of a DFE circuit 400 that is similar to the DFE circuit 300 of FIG. 3, except that the binary output of the decision-making slicer circuit 120 is fed into a digital delay line formed by the sequence of latch circuits 332 (or flip-flops). Multiple outputs from this delay line can in turn serve as inputs to the same continuous time feedback filter 431 in a feedback circuit 430. More specifically, as depicted in FIG. 4, the feedback circuit 430 comprises a high order continuous time feedback filter 431 with multiple input ports, wherein one input port of the feedback filter 431 is connected directly to the output of the decision-making slicer circuit 120 and one or more additional input ports of the feedback filter 431 is connected to the output of a different latch circuit 332.

In the exemplary DFE embodiment of FIG. 4, the single high order continuous time filter 431 can be designed to filter the output of the decision-maker slicer circuit 120 at different times for a given channel impairment that is excited multiple times for a given data bit. For example, in a specific case of a channel impairment that results in reflections, the DFE circuit 400 of FIG. 4 can be designed with knowledge that multiple reflections can occur off similar structures in the same channel. As such, the same high-order continuous-time feedback filter 431 can be used to compensate for multiple reflections (with appropriately delayed stimuli via the latches 332) at relatively low overhead, which is an advantage compared to a conventional DFE with multiple discrete-time taps. As with the DFE circuit 300 of FIG. 3, the delay provided by the sequence of latches can be based on a specified number of clock cycles. With the embodiments of FIGS. 3 and 4, an adaptation algorithm may be implemented to dynamically adjust the delay provide by the sequence of latches 332.

Figure 5:
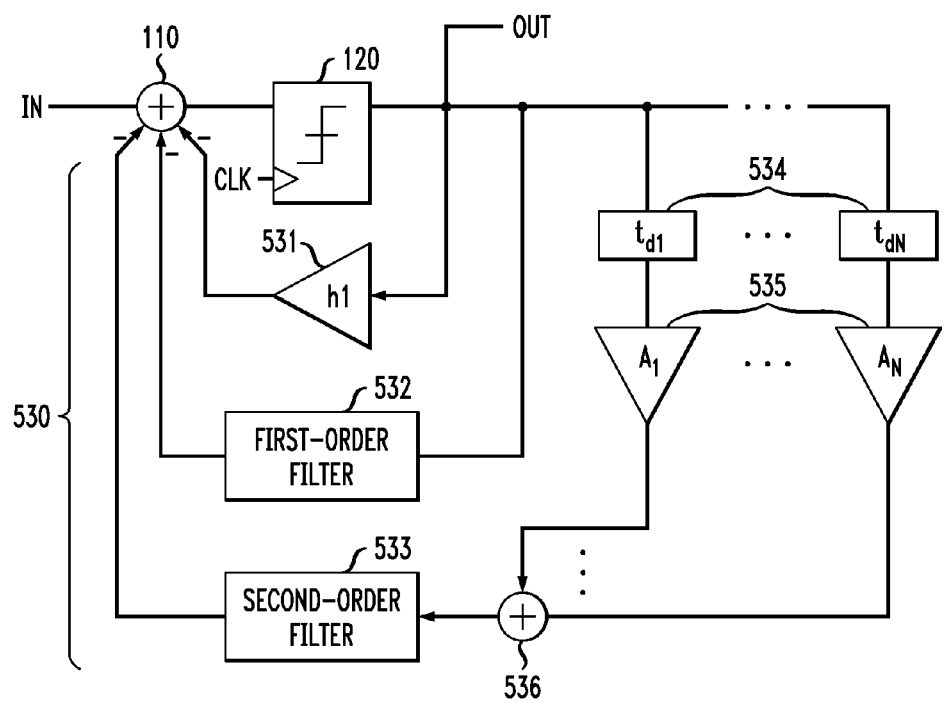
FIG. 5 is a block diagram of a DFE circuit implementing a high-order continuous time filter in a feedback path of the DFE, according to another exemplary embodiment of the invention.

In other exemplary embodiments of the invention, a DFE circuit can be implemented with feedback circuits that implement both conventional discrete "taps" (e.g., H1, H2, etc.) and one or more continuous time feedback filters in different feedback paths of the DFE to compensate for channel responses comprising channel loss, reflections, etc. For instance, FIG. 5 is a block diagram of a DFE circuit implementing a high-order continuous time filter in a feedback path of the DFE, according to another exemplary embodiment of the invention. More specifically, FIG. 5 illustrates a DFE circuit 500 comprising a summer amplifier circuit 110, a decision-making slicer circuit 120, and a feedback circuit 530. The summer circuit 110 and decision-making slicer circuit 120 operate similar to those circuits discussed above with reference to FIG. 1, for example.

The feedback circuit 530 of the DFE circuit 500 of FIG. 5 comprises at least one discrete-time tap ($H_1$) 531, at least one $1^{st}$ order continuous time feedback filter 532, and at least one high ($2^{nd}$) order continuous time feedback filter 533, in different feedback paths of the feedback circuit 530. The feedback circuit 530 further comprises a plurality of delay lines 534 (providing different delays $t_{d1}, \ldots, t_{dN}$, which could each be an integer or non-integer number of unit intervals in length), a plurality of analog amplifiers 535 (providing different amplitude weights $A_1, \ldots, A_N$), and a summer circuit 536.

In the exemplary embodiment of FIG. 5, the one or more discrete-time taps ($H_1$) 531 can be employed and adjusted independently of the feedback filters 532 and 533 to compensate for the post-cursors in the fast changing region of the channel impulse response that follows the main cursor, as is understood by those of ordinary skill in the art. In particular, the single discrete-time tap (H1) 531 can be used to account for latency in the first- and second-order feedback filters 532 and 533. The $1^{st}$ order feedback filter 532 can be implemented as discussed above, to cancel ISI that is caused by channel insertion loss and other types of channels impairment that generate frequency responses that are similar to a first-order low-pass filter. The gain and time constant of the first-order feedback filter 532 can be adjusted to match characteristics of the channel pulse response.

Moreover, the high-order ($2^{nd}$ order) feedback filter 533 can be implemented as discussed above to cancel ISI due to structured channel responses, such as reflections dues to via stubs, etc. The natural frequency and quality factor of the second-order feedback filter 533 (i.e., $\omega_0$ and Q in the transfer function H(s) described above) can be adjusted to match the reflection characteristics. In other exemplary embodiments, since multiple reflections can occur due to a single dominant via stub, a provision for multiple injections is made using the plurality of independent time delays, $t_{dN}$, and independent amplitudes, $A_N$, provided by the digital delay circuits 534 and the analog amplifier circuits 535. The different time delays ($t_{d1}, \ldots, t_{dN}$) and injection amplitudes ($A_1, \ldots, A_N$) can be adjusted to match the time-of-arrival and magnitude, respectively, of a targeted reflection. The outputs of the analog amplifiers 535 are input to the summer circuit 536, and the output of the summer circuit 536 is connected to the input of the feedback filter 533. This allows the same feedback filter 533 and 'tap' on the input summer 536 to compensate for multiple reflections. Depending on the implementation of the feedback filter 533, the summer circuit 536 can be implemented within the feedback filter 533 (for example, by summing currents in a transconductor-capacitor (Gm-C) continuous-time filter).

This technique recognizes that, in complex channels with large via stubs, reflections can be a significant contributor to ISI. As there can be considerable "dead time" between the arrival of a data bit and the arrival of the reflections created by the data bit, the different input taps ($t_{d1}/A_1, \ldots, t_{dN}/A_N$) can be assigned to a variable time step through use of the delay lines 534 and weighting (or amplitude) via the analog amplifiers 535 to allow the input taps to the feedback filter 533 to cancel ISI in regions of the channel pulse response where those ISI terms are highest, while ignoring areas of relatively low ISI where their contribution would be insignificant.

Figure 6:
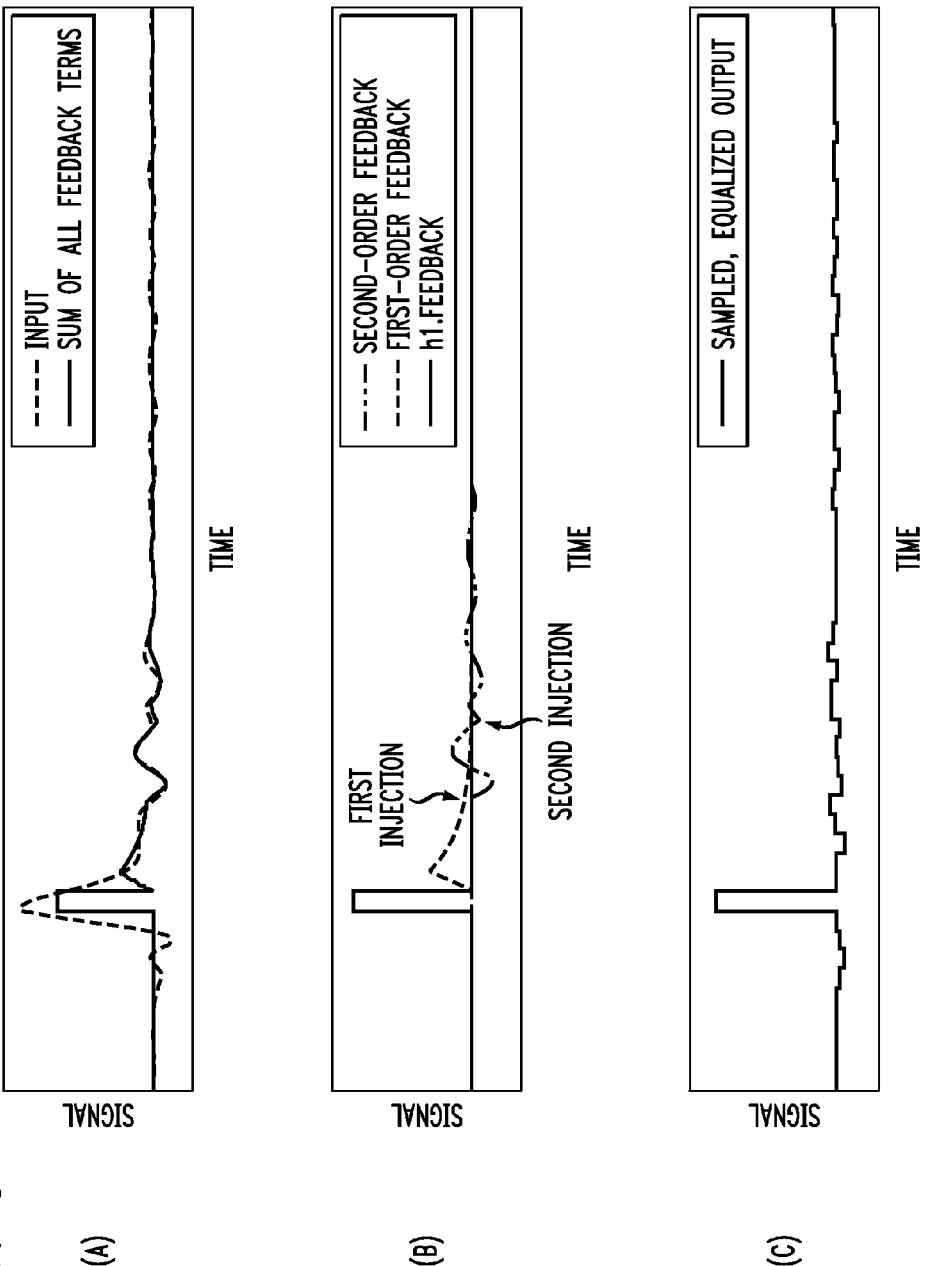
FIG. 6 depicts simulated waveforms that illustrate the performance achieved with the DFE circuit of FIG. 5 operating on a legacy backplane channel at 16 Gbps.

FIG. 6 depicts simulated waveforms that illustrate the performance achieved with a DFE circuit based on the architecture of FIG. 5 operating on a legacy backplane channel at 16 Gbps. In particular, FIG. 6 shows simulated waveforms for a DFE circuit having a single discrete-time tap (H1), a first order RC-IIR feedback filter and a $2^{nd}$ order band pass IIR-filter with a double injection ($t_{d1}/A_1$ and $t_{d2}/A_2$). The waveforms shown in (A) include both an unequalized input signal (resulting from a data bit of logic "1" transmitted over a channel) and a sum of the various feedback signals from the feedback paths (the equalizer feedback). The waveforms shown in (B) include the various feedback signals on the feedback paths, which are input to the summer 110. In particular, the feedback signals include the H1 feedback signal output from the discrete-time tap 531, the first order feedback signal output from the first order feedback filter 532, and the second-order feedback signal output from the second order feedback filter 533. The waveform shown in (C) includes equalized signal at the output of the summer circuit 110 as sampled by the decision-making slicer 120.

In the waveforms of FIG. 6, for latency reasons, first post cursor ISI cancellation is provided by the $H_1$ feedback tap 531 as discussed above. Subsequently, the channel loss creates a first-order decay "tail" similar to that of an RC circuit, which is matched by the first-order RC feedback filter 532. Upon the arrival of the first reflection from a via stub in the channel, a stimulus (labeled "first injection) is applied to the second-order feedback filter 533. Then, a second, smaller stimulus (labeled "second injection") is applied to match the subsequent arriving reflection. Beyond this, the remaining reflections no longer contribute significant ISI (although further injections can be used to cancel the remaining reflections, if desired, using circuitry similar to that employed for cancellation of the first and second reflections). The sum of thee feedback signals is subtracted from the input signal by the summer circuit 110, and the result is sampled by the decision-making slicer 120 to make decisions on the value of the incoming bits. The input signal to the decision-making slicer 120 as shown in waveform (C) shows only a minimal amount of residual ISI. The simulated performance of the example implementation shown in FIG. 6 was found to match that of a 8-tap conventional discrete-time DFE.

In each of the exemplary DFE circuit embodiments of described herein, at least one high order continuous time feedback filter is employed in a feedback circuit of the DFE to emulate structured elements of a channel response that cannot be approximated using a first order low pass RC filter or otherwise compensated for using a low number of discrete-time taps. Regardless of the approach taken, any combination of feedback filters can be used in place of, or as a supplement to, discrete-time feedback taps. The response of the high-order feedback filters are calibrated to match the channel characteristics, or match that portion of the channel characteristics left unequalized by discrete-time feedback, if present. By using higher-order feedback, embodiments of the invention can address a wider range of channel types/structures than the first-order continuous-time DFE concept, while retaining its low tap-count.

Further aspects of the present invention provide DFE circuits that can be utilized in integrated circuit chips with various analog and digital integrated circuitries. In particular, integrated circuit dies can be fabricated having DFE circuits and other semiconductor devices such as field-effect transistors, bipolar transistors, metal-oxide-semiconductor transistors, diodes, resistors, capacitors, inductors, etc., forming analog and/or digital circuits. The DFE circuits can be formed upon or within a semiconductor substrate, the die also comprising the substrate. An integrated circuit in accordance with the present invention can be employed in applications, hardware, and/or electronic systems. Suitable hardware and systems for implementing the invention may include, but are not limited to, personal computers, communication networks, electronic commerce systems, portable communications devices (e.g., cell phones), solid-state media storage devices, functional circuitry, etc. Systems and hardware incorporating such integrated circuits are considered part of this invention. Given the teachings of the invention provided herein, one of ordinary skill in the art will be able to contemplate other implementations and applications of the techniques of the invention.

Although exemplary embodiments of the present invention have been described herein with reference to the accompanying figures, it is to be understood that the invention is not limited to those precise embodiments, and that various other changes and modifications may be made therein by one skilled in the art without departing from the scope of the appended claims.

What is claimed is:

1. A DFE (decision feedback equalizer) circuit, comprising:
   a summer circuit to add a first feedback signal, a second feedback signal, and a received signal and generate an input signal;
   a decision-making slicer circuit to sample the input signal from the summer circuit and generate an output signal;
   a feedback circuit comprising:
      a first feedback filter in a first feedback path of the DFE, wherein the first feedback filter comprises a continuous time filter with an order of at least 1, which generates the first feedback signal;
      a second feedback filter in a second feedback path of the DFE, wherein the second feedback filter comprises a continuous time filter with an order greater than 1, which generates the second feedback signal;
      a first delay circuit and a second delay circuit;
      a first analog amplifier and a second analog amplifier; and
      a second summer circuit;
      wherein the first delay circuit and first analog amplifier are serially connected between an output of the decision-making slicer circuit and a first input of the second summer circuit,
      wherein the second delay circuit and second analog amplifier are serially connected between an output of the decision-making slicer circuit and a second input of the second summer circuit, and
      wherein an output of the second summer circuit is connected to an input of the second feedback filter.

2. An integrated circuit chip comprising an integrated circuit, the integrated circuit comprising the DFE circuit of claim 1.

3. The DFE circuit of claim 1, wherein the feedback circuit further comprises a discrete-time tap within a third feedback path of the DFE circuit to generate a third feedback signal that is input to the summer circuit.

4. A DFE (decision feedback equalizer) circuit, comprising:
   a summer circuit to add a first feedback signal, a second feedback signal, and a received signal and generate an input signal;
   a decision-making slicer circuit to sample the input signal from the summer circuit and generate an output signal;
   a feedback circuit comprising:
      a first feedback filter in a first feedback path of the DFE, wherein the first feedback filter comprises a continuous time filter with an order of at least 1, which generates the first feedback signal;
      a second feedback filter in a second feedback path of the DFE, wherein the second feedback filter comprises a continuous time filter with an order greater than 1, which generates the second feedback signal;
      a first delay circuit and a second delay circuit; and
      a first analog amplifier and a second analog amplifier;
      wherein the first delay circuit and first analog amplifier are serially connected between an output of the decision-making slicer circuit and a first input of the second feedback filter,
      wherein the second delay circuit and second analog amplifier are serially connected between an output of the decision-making slicer circuit and a second input of the second feedback filter;
      wherein the second feedback filter is a transconductor-capacitor (Gm-C) continuous time filter that sums signals input to the first and second inputs of the second feedback filter.

\* \* \* \* \*